United States Patent
Balkesen et al.

(10) Patent No.: US 10,599,647 B2
(45) Date of Patent: Mar. 24, 2020

(54) PARTITIONING-BASED VECTORIZED HASH JOIN WITH COMPACT STORAGE FOOTPRINT

(71) Applicant: Oracle International Corporation, Redwood Shores, CA (US)

(72) Inventors: Cagri Balkesen, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 15/852,038

(22) Filed: Dec. 22, 2017

(65) Prior Publication Data

US 2019/0197159 A1    Jun. 27, 2019

(51) Int. Cl.
| | | |
|---|---|---|
| *G06F 17/30* | (2006.01) | |
| *G06F 16/2453* | (2019.01) | |
| *G06F 16/22* | (2019.01) | |
| *G06F 16/2455* | (2019.01) | |

(52) U.S. Cl.
CPC .... *G06F 16/24537* (2019.01); *G06F 16/2237* (2019.01); *G06F 16/2255* (2019.01); *G06F 16/2456* (2019.01); *G06F 16/24554* (2019.01)

(58) Field of Classification Search
CPC .......... G06F 16/2237; G06F 16/24554; G06F 16/2456; G06F 16/2255; G06F 16/24537
USPC ....................................................... 707/714
See application file for complete search history.

(56) References Cited

U.S. PATENT DOCUMENTS

| | | | | |
|---|---|---|---|---|
| 7,287,131 | B1* | 10/2007 | Martin ................ | G06F 16/9014 |
| | | | | 711/154 |
| 2014/0115182 | A1* | 4/2014 | Sabaa ................ | H04L 67/1097 |
| | | | | 709/232 |
| 2014/0372392 | A1* | 12/2014 | Attaluri .............. | G06F 16/2255 |
| | | | | 707/696 |
| 2018/0211046 | A1 | 7/2018 | Muttik | |

OTHER PUBLICATIONS

Maged M. Michael: "High Performance Dynamic Lock-Free Hash Tables and List-Based Sets", IBM Thomas J. Watson Research Center, SPAA'02, Aug. 10-13, 2002, Winnipeg, Manitoba, Canada. (Year: 2002).*

(Continued)

*Primary Examiner* — Kuen S Lu
(74) *Attorney, Agent, or Firm* — Hickman Palermo Becker Bingham LLP

(57) ABSTRACT

Techniques are described for generation of an efficient hash table for probing during join operations. A node stores a partition and generates a hash table that includes a hash bucket array and a link array, where the link array is index aligned to the partition. Each hash bucket element contains an offset that defines a location of a build key array element in the partition and a link array element in the link array. For a particular build key array element, the node determines a hash bucket element that corresponds to the build key array. If the hash bucket element contains an existing offset, the existing offset is copied to the link array element that corresponds to the offset of the particular build key array element and the offset for the particular build key array element is copied into the hash bucket element. When probing, the offset in a hash bucket element is used to locate a build key array element and other offsets stored in the link array for additional build key array elements.

22 Claims, 10 Drawing Sheets

(56) References Cited

OTHER PUBLICATIONS

Idicula, U.S. Appl. No. 15/882,108, filed Jan. 29, 2018, Office Action, dated Dec. 28, 2018.
C. Balkesen et al.. "Main-memory hash joins on multi-core CPUs: Tuning to the underlying hardware," 2013 IEEE 29th International Conference on Data Engineering, pp. 362-373.
Begley et al. "MCJoin: A Memory-constrained Join for Column-Store Main-memory Databases", dated 2012, ACM SIGMOD International Conference on Management of Data (SIGMOD '12), pp. 121-132.
Xu et al., "A Flight Data Recorder for Enabling Full-system Multiprocessor Deterministic Replay", 30th Annual International Symposium on Computer Architecture San Diego, CA, Jun. 2003, 12 pgs.
Staats et al., "Parallel Symbolic Execution for Structural Test Generation", ISSTA'10, Jul. 12-16, 2010, Trento, Italy, 11 pages.
Sorin, "SafetyNet: Improving the Availability of Shared Memory Multiprocessors with Global Checkpoint/Recovery", dated May 2002, 14 pages.
Sheehy, Justin, "Why Vector Clocks Are Hard", Basho Blog, dated Apr. 5, 2010, 14 pages.
Roy et al., "Hybrid Binary Rewriting for Memory Access Instrumentation", VEE'11, Mar. 9-11, 2011, Newport Beach, California, USA, 12 pages.
Luk, et al., "Pin: Building Customized Program Analysis Tools with Dynamic Instrumentation", PLDI'05 Jun. 12-15, 2005,Chicago,Illinois,USA, 11 pages.
Liu et al., "ad-heap: an Efficient Heap Data Structure for Asymmetric Multicore Processors", In Proceedings of Workshop on General Purpose Processing Using GPUs, ACM, dated 2014, 10 pages.
LeGendre, Matthew, "Dyninst as a Binary Rewriter", dated Apr. 2008, 23 pages.
LaMarca et al., "The Influence of Caches on the Performance of Heaps", dated Jan. 1, 1996, 26 pages.
Graham, "gprof: a Call Graph Execution Profiler" dated 1982, 10 pages.
Furtak et al., "Using SIMD Registers and Instructions to Enable Instruction-Level Parallelism in Sorting Algorithms", ACM Symposium on Parallel Algorithms and Architectures, dated 2007, 10 pages.

D.E. Knuth, "The Art of Computer Programming", vol. 3: 2nd Edition Sorting and Searching, ISBN: 0-201-03803-X, pp. 129-157 from book, dated 1973.
Bach et al., "Analyzing Parallel Programs with Pin", Computer, Published by the IEEE Computer Society, dated 2010, 8 pages.
"Linux/UNIX System Programming Training", dated Aug. 14, 2107, 12 pages, http://man7.org/linux/man-pages/man1/gcov.1.html.
Xiaochen et al, "Register Level Sort Algorithm on Multi-core Simd Processors", In Proceedings of the 3rd Workshop on Irregular Applications: Architectures and Algorithms, IA3, dated 2013, 8 pages.
Wegner et al., "The External Heapsort". IEEE Trans. Softw. Eng., dated Jul. 1989. ISSN 0098-5589, 9 pages.
Satish et al., "Fast Sort on Cpus, Gpus and Intel Mic Architectures", Intel, 11 pages.
Khuong et al., "Heapsort: More Comparisons, Less Memory Tra_c", dated Apr. 2014, 34 pages.
J. Chhugani et al., ". Efficient implementation of Sorting on Multi-Core Simd Cpu Architecture", Proc. VLDB Endow., 1(2):1313{1324, datged Aug. 2008. ISSN 2150-8097, 12 pages.
Harada and L. Howes. "Introduction to gpu radix sort". Dated 2011, 3 pages.
H. Inoue and K. Taura. "Simd- and Cache-friendly Algorithm for Sorting an Array of Structures", Proc. VLDB Endow., dated Jul. 2015. ISSN 2150-8097, 12 pages.
Fadel et al., ". Heaps and Heapsort on Secondary Storage", Theor. Comput. Sci., 220(2):345-362, dated Jun. 1999. ISSN 0304-3975, 18 pages.
Gedik et al., "Cellsort: High Performance Sorting on the Cell Processor", in Proceedings of the 33rd International Conference on Very Large Data Bases, VLDB '07, VLDB Endowment, 2007, 12 pages.
E. Knuth. "The Art of Computer Programming", vol. 3: (2Nd Ed.) Sorting and Searching. AddisonWesley Longman Publishing Co., Inc., Redwood City, CA, USA, 1998. ISBN 0-201-89685-0.
Bramas. "Fast Sorting Algorithms Using AVX-512 on Intel Knights Landing" CoRR, abs/1704.08579, 2017a. URL http://arxiv.org/abs/1704.08579, dated 2017, 17 pages.
Bramas. "A Novel Hybrid Quicksort Algorithm Vectorized Using AVX-512 on Intel Skylake", International Journal of Advanced Computer Science and Applications (IJACSA), Nov. 2017, 9 pages.

* cited by examiner

FIG. 3
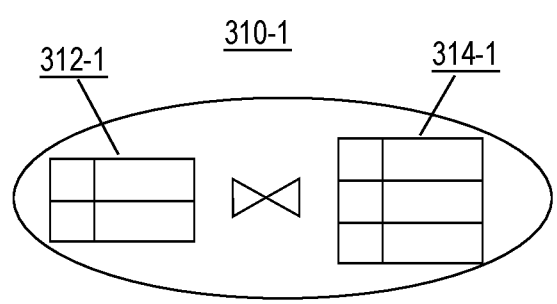
TABLE R 305
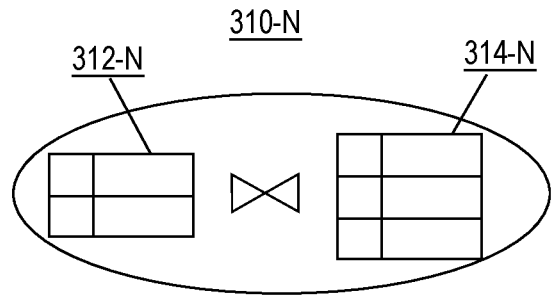
TABLE S 350

PARTITIONING-BASED VECTORIZED HASH JOIN WITH COMPACT STORAGE FOOTPRINT

FIELD OF THE INVENTION

The present invention relates to query processing techniques, and more specifically, to computer-implemented techniques for partitioning-based vectorized hash join.

BACKGROUND

Database servers commonly receive commands that require the performance of a class of operations known as "join operations." A join operation is used to combine multiple tables, so that data from those tables may be selected in a query. A query that joins two tables may specify how the tables are joined using join criteria. A join operation comprises merging each row in a first table with each row of a second table that matches the join criteria. For example, a query may specify that rows in the first table only join with rows in a second table when rows in the first table have a value in a particular column that equals the value in a particular column of rows in the second table. The corresponding columns that contain the values that determine which rows of the first table join with which rows of the second table are referred to as the "join keys."

Database servers may rely on an algorithm known as a "hash join" to efficiently perform join operations. The "hash join" operation typically comprises two phases. In the first phase, known as the "build phase," the database server generates a hash table by hashing each row of the build table according to a hash function on the join key. In the second phase, known as the "probe phase," the database server iteratively scans through each row of the second table, referred to herein as the probe table. For each row in the probe table, the database server uses the hash function and the hash table to identify rows in the build table with equal join key values. When matching rows with equal join key values are identified, the rows are merged and added to the result set for the join operation.

Hash joins, where large hash tables are generated, may suffer from high latency when accessing the hash table due to cache misses. For example, hash joins that generate large hash tables may result in at least part of the hash table being stored in DRAM-based main-memory instead of being cached in SRAM-based CPU cache. DRAM refers to dynamic random-access memory and SRAM refers to static random-access memory. As a result, hash lookups for data not stored within the cache results in cache misses. Additionally, modern hardware architectures with multiple processing cores, sophisticated caching architectures, and custom instructions may become inefficient due to cache misses and branch mispredictions. Branching in code may be defined as instructions the execution of which are dependent on data values. One example of code branching is if/else statements where, depending on data values, the CPU may execute one block of code instead of another. CPU architectures have been developed to speculate on branching and/or data values, based upon traces of executions, in order to predict which branch should be executed. For example, the CPU may expect that 90% of the time code block A is executed over code block B. In this case the CPU may execute code block A for the data based upon the expectation that 90% of the time the data values will indicate that code block A should be executed. After executing code block A, the CPU may evaluate the data values to determine whether the branch prediction was correct. If, however, executing code block A was the incorrect prediction, then the CPU will have to revert executions performed in code block A, which may result in flushing several CPU cycles. Branch mispredictions, such as the one described, may result in the CPU flushing several CPU cycles of incorrectly predicted executions. Branch mispredictions on modern hardware architectures may result in flushing entire queues of data in order to correct branch prediction errors, which may result in stalls in execution of code. Therefore, there is a need for efficient hash join algorithms that address the demands of large hash tables and the complexity of modern hardware using an architecture-conscious design that reduces instances of cache misses and branch mispredictions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts an example embodiment of phases of a hash join technique.

DETAILED DESCRIPTION

Figure 1:
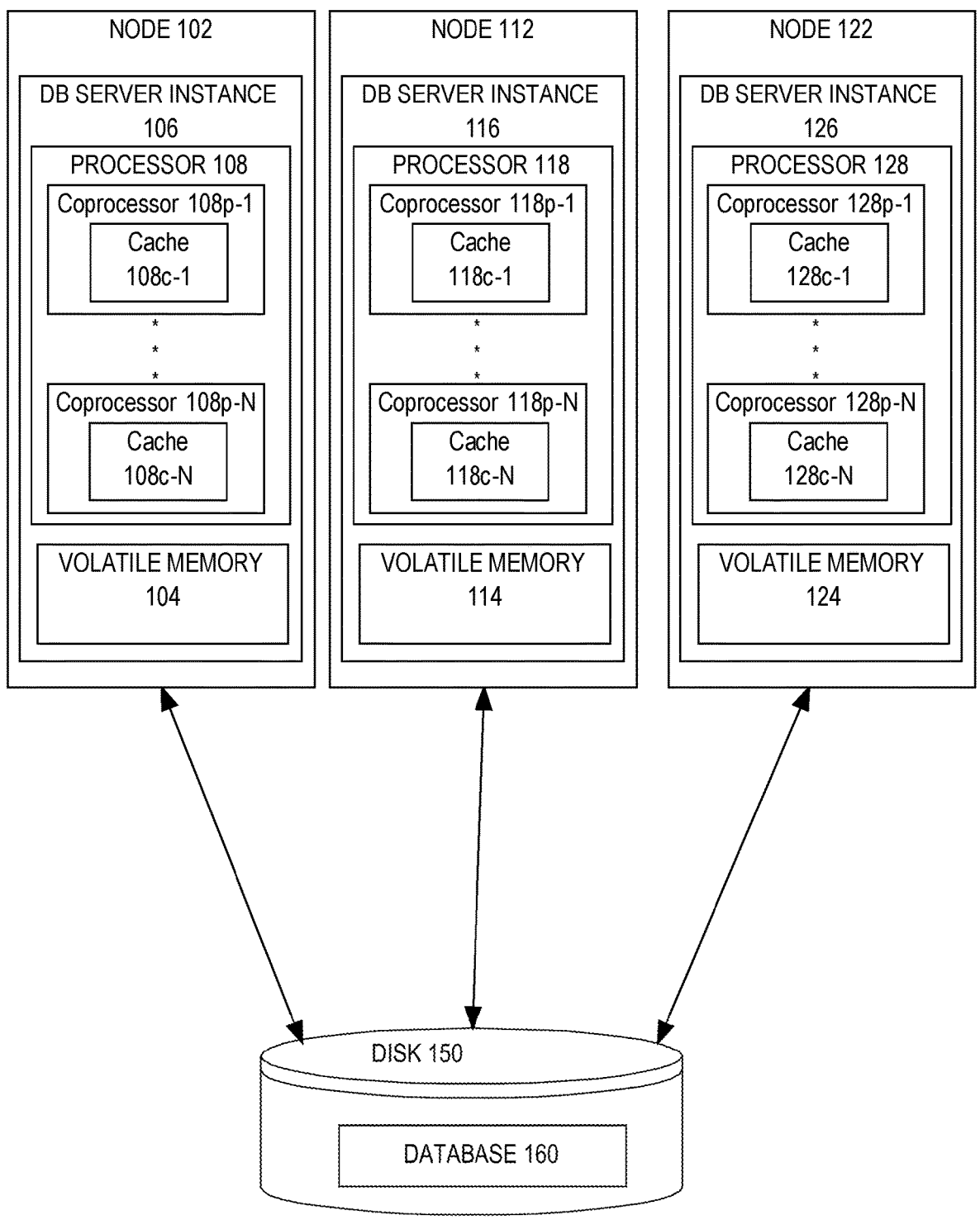
FIG. 1 is a block diagram illustrating a system architecture of a multi-node database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for generating of a hash table structured to enable more efficient probing during a join operation and minimize memory storage requirements. Because memory storage requirements are minimized, the memory storage footprint of the hash table within a cache is smaller.

An advantage of the techniques described herein is that cache containment of a hash join operation is achieved for larger subsets of data. Cache containment is achieved when memory accesses that are performed for a hash join operation on a subset of a body data are limited to a cache used to store the subset of data. The term cache refers to an area of memory that is used to temporarily store a portion of a body data to stage the portion for quicker access to perform an operation, such as a hash join, where the body of data, including at least a version of the staged portion, is also stored in slower-to-access higher latency memory. The operation may entail generating interim data in the cache that will not be stored in the slower-to-access higher latency memory. An example of a cache is a memory area within a SRAM-based CPU memory that temporarily stores a portion of data from a DRAM-based main memory that is coupled to the CPU. When cache containment for the portion of data is achieved for a hash join operation, higher latency accesses to DRAM-based main memory are avoided.

Because the memory footprint of the hash table is smaller, a hash join operation may be performed on a larger amount of data while achieving cache containment. This means a body of data may be split into a smaller number of partitions that are larger but may nevertheless be processed with cache containment. Processing a lesser number of partitions also enables more efficient parallel processing for a given number of processing cores.

In an embodiment, a node stores a partition of a body data, the partition comprising a build key array. Each build key array element of the build key array holds a join key value from a build table. A node is configured to generate a hash table that comprises a hash bucket array and a link array. Each element of the hash bucket array corresponds to a single hash bucket and is referred to herein as a hash bucket element. A link array comprises link array elements and is index aligned with the build key array. The hash bucket and link array together identify "hash bucket chains" of elements in the build key array that belong to hash buckets. A particular hash bucket element corresponds to a particular chain. A hash bucket chain may be referred to herein as a chain, and the build key array elements in a hash bucket chain are referred to as members of the chain or hash bucket chain.

A hash bucket element itself identifies an offset of a member build key array element in the hash bucket chain. The term offset value is used herein to refer to a value from which an ordinal position of an array element ("index") within an array may be derived. For example, index values may be derived from an offset value by subtracting 1.

As the build key array and link array are aligned, the offset in the hash bucket element to the build key array element also identifies a corresponding link array element. This corresponding link array element may hold another offset that identifies both another build key array element that is a member in the chain and a preceding link array element, which in turn, may hold another offset to a member and preceding link array, and so forth. In effect, the build key array elements that hold join key values of a hash bucket chain are identified by a hash bucket element and a series of link array elements pointed to by the hash bucket element, the series being interlinked by offset values in the link array elements.

To perform the probe phase of a hash join, a node processes a probe key array of probe key array elements, each probe key array element holding a join key value from the probe table of the hash join operation. For each probe key array element, the node determines the hash bucket element that corresponds to the probe key array element value. Once determined, the hash bucket element and series of link array elements linked to the hash bucket element are used to identify which build key array elements belong to the hash bucket. The join key values of the identified build key array elements are compared to the join key value stored in the probe key array element to determine which rows from the hash table side are to be joined to which rows on the probe side table.

System Overview

FIG. 1 depicts a multi-node database system on which an embodiment may be implemented. In the embodiment illustrated in FIG. 1, DBMS 100 comprises three nodes, 102, 112, and 122. Although three nodes are shown in the present illustration, in other embodiments, DBMS 100 may comprise fewer or more nodes.

Each of nodes 102, 112, and 122 have access to the same database 160. For the purpose of illustration, database 160 is shown as stored on a single shared disk 150, but in alternative embodiments may be spread across multiple disks to which each of nodes 102, 112, and 122 have access.

According to an embodiment, each of nodes 102, 112, and 122 include a multi-core processor that comprises multiple co-processors on the same chip. Nodes 102, 112, 122 comprise multi-core processors 108, 118, and 128, and main volatile memory 104, 114, and 124. Main volatile memory 104, 114, and 124 are connected to processors 108, 118, and 128 via a bus (not shown).

Processor 108 comprises coprocessor 108$p$-1 through 108$p$-N. Each of these coprocessors comprises separate circuitry on the same chip, and is connected to a local cache. Coprocessor 108$p$-1 is connected to local cache 108$c$-1 and coprocessor 108$p$-N is connected to local cache 108$c$-N. In an embodiment, a local cache may comprise L1 or L2 cache, or a scratchpad memory. Scratchpad memory may refer to a fast-access memory that is electronically coupled to a coprocessor.

Processor 118 comprises processor 118$p$-1 through 118$p$-N. Processor 118$p$-1 is connected to local cache 118$c$-1 and processor 118$p$-N is connected to local cache 118$c$-N. Processor 128 comprises processor 128$p$-1 through 128$p$-N. Processor 128$p$-1 is connected to local cache 128$c$-1 and processor 128$p$-N is connected to local cache 128$c$-N.

In an embodiment, nodes 102, 112, and 122 respectively execute database server instances 106, 116, and 126. While in the illustrated embodiment each node is executing a single database server instance, in alternative embodiments, a single node may execute more than one database server instance.

Hash Join

A database query may include a join operation. A query optimizer is configured to parse the query and determine tables involved in the join operation. The query optimizer may then determine to perform the join operation using a hash join. As mentioned before, a hash join algorithm involves multiple phases including, but not limited to, a partition phase, a build phase, and a probe phase. During the partition phase, the database system may partition one or more tables that are part of the join operation. Each partition includes a build key array and probe key array and may include one or more payload arrays that each contain column values of a column not involved in the join condition from the build table or probe table. By partitioning large tables into partitions, each partition may be allocated and processed by a node such that the partition may be fully loaded into cache. Loading the entire partition into a node's cache increases cache containment.

During the build phase, the node constructs a hash table based on a build key array of partition. The node builds the hash table by scanning the payload elements and hashing the payload elements based on the join keys.

During the probe phase, the node scans probe key array elements from a probe key array. The node hashes each probe key array element of the probe key array to identify the hash bucket element identifying the chain of build key elements corresponding to the probe key array element. Then the node compares the probe key element to each build key array element in the chain to determine whether the probe key array element and the build key array element match. Rows corresponding to each matching payload key array element and build key array element are then used to create a result set of joined values.

Figure 2:
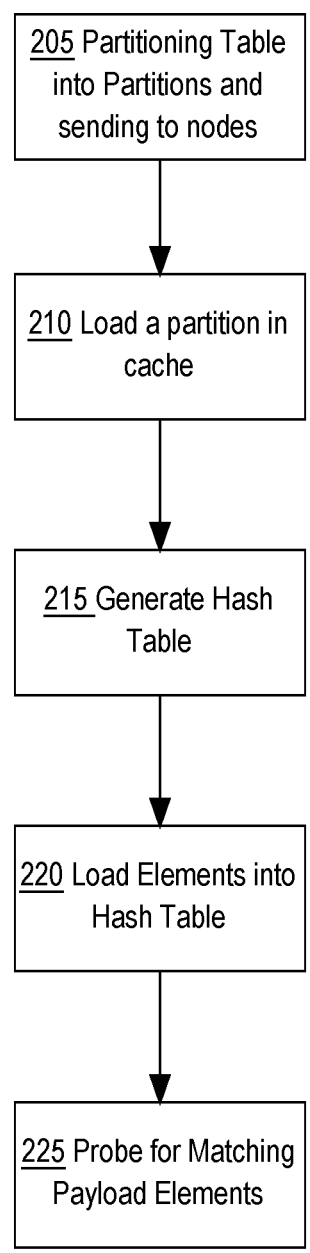
FIG. 2 is an example flowchart illustrating a database system performing steps of a hash join by partitioning a table, building a hash table, and probing the hash table for matching entries.

FIG. 2 depicts a flowchart illustrating the steps performed by a database system to perform hash joining, according to an embodiment.

Partition Phase

Referring to FIG. 2, at step 205 DBMS 100 uses a query optimizer to parse the query and determine tables that are part of the join operation and then partitions the tables involved in the join operation into partitions. The partitions are sent to nodes 102, 112, and 122. For example, the join operation may include tables R and S and DBMS 100 may partition table R into partitions for the build phase. In an embodiment, DBMS 100 determines the number and size of the partitions based upon the size of the table, the number of available nodes for processing, and the sizes of the local caches on available nodes, e.g. sizes of local caches 108c-1-108c-N. Partitioning enables the ability for independent parallelism by assigning partitions to multiple nodes where coprocessors are able to work on a different partition independently in a parallel environment.

Additionally, the relatively smaller footprint of the hash table means that the partitions into which the tables are partitioned may be larger, i.e. contain more data or larger portion of rows of tables involved in hash join. Thus, larger partitions may be configured to fit within the caches of each of nodes 102, 112, and 122 respectively. If each partition is able to fit within the cache of each respective node 102, 112, and 122 then the build and probe phases may be able to be performed with cache containment.

In an embodiment, DBMS 100 determines the number of coprocessors of nodes 102, 112, and 122 that are available for processing the hash join. DBMS 100 then determines the sizes of the caches of the available coprocessors. Available cache size may be based upon determining the size of the hash table data structures that need to be generated for the hash join. By sizing the partition based upon the available cache memory, DBMS 100 is able to ensure that the partition fits within the available cache within node 102 in a way that ensures cache containment.

In an embodiment, DBMS 100 estimates the partition sizes of the table using database table statistics provided by the DBMS. Database table statistics refers to statistical information about the distribution of values in one or more columns of a table. DBMS 100 may be able to use database table statistics to estimate the cardinality, and the relative size of a group of rows within a table. By using the database table statistics, DBMS 100 may be able to estimate the size of partitions of a table for the purpose to estimating the size of a hash table build.

FIG. 3 depicts an example of the phases of the hash join technique where table R 305 and Table S 350 are partitioned and processed in parallel by multiple coprocessors of processors 108, 118, and 128 on nodes 102, 112, and 122, respectively. In an embodiment, Table R 305 and Table S 350 represent tables that are a target of the join operation. At step 205, DBMS 100 partitions Table R 305 and Table S 350 into multiple partitions 310-1 through 310-N. Each of partitions 310-1 through 310-N includes a build key array containing join key values from Table R 305 and a probe key array containing join key values from Table S 350. Partition 310-1 includes build key array 312-1 and probe key array 314-1, and partition 310-N includes build key array 312-N and probe key array 314-N.

Build Phase

Referring to FIG. 2, at step 210, each of nodes 102, 112, and 122 receive partitions and store each of the received partitions within their respective main memory. Each of the partitions that is stored in main memory of nodes 102, 112, and 122 are loaded into a local cache of a coprocessor of nodes 102, 112, and 122, respectively. Each coprocessor performs a hash join for partition loaded into the local cache of the coprocessor.

Steps 215-225 describe steps for performing a hash join, and in particular, for generating a hash table, populating the hash table, and probing the hash table for elements that match the join condition. Each of the steps is performed, in parallel by a coprocessor of each of nodes 102, 112, and 122. For the purposes of exposition, steps 215-225 are described in terms of execution by coprocessor 108p-1 of node 102. Coprocessor 108p-1 is performing a hash join on a partition 310-1, which has been loaded into cache 108c-1.

At step 215, coprocessor 108p-1 generates a hash table within cache 108c-1. In an embodiment, coprocessor 108p-1 generates a hash table comprising a hash bucket array and a link array. The hash bucket array is made up of hash bucket elements, where each hash bucket element corresponds to a hash value that is calculated using a hash function. When the hash table is populated, elements from the build key array are assigned to hash bucket elements based on calculated hash values.

The size of the hash bucket array is based upon the size of the partition. In an embodiment, coprocessor 108p-1 determines the size (i.e. number of elements) of the hash bucket array as being a power of two. By making the hash bucket array size a power of two, the coprocessor 108p-1 is able to efficiently perform modulo hash computations with bitmasking and shifting. For example, if the build key array contains 8 elements, then coprocessor 108p-1 may generate a hash bucket array of size 4, which is a power of two. In another example, if the build key array contains 10 elements, then coprocessor 108p-1 may start by initially calculating the hash bucket array size as half of the number of elements, which equals 5. However, 5 is not a power of two, therefore coprocessor 108p-1 may increase the hash bucket array size from 5 to the next higher power of two, which is 8. Alternatively, coprocessor 108p-1 may decrease the hash bucket array size from 5 to the next lower power of two, which is 4. By maintaining the hash bucket array size as a power of two, hash function calculations may be efficiently performed using bitmasking and shifting techniques.

In an embodiment, the hash bucket elements in the hash bucket array are configured to store an offset value that identifies an index of both a build key array element and link array element. The offset value may be calculated based on the index. For example, if hash bucket element "A" corresponds to hash value "0xf01", which is located at index value 2, and has a calculated hash value matching "0xf01," then the hash bucket element A would store an offset value based on the index value 2, which in this case may equal "index value+1". Here, the hash bucket element A would store an offset value equal to 3. By calculating the offset values as the "index value+1", offset values that are greater than or equal to 1 may indicate a build key array element that has a matching hash value. Offset values that are equal to zero may indicate that there are no build key array elements that have a matching hash value because an offset value minus 1 (0-1) would yield a index value of −1. In other embodiments, the offset value may represent a value that equals or is based on an index value. For example, the offset value may equal the index value plus two, three, or any other value. In an embodiment, coprocessor 108p-1 may configure the datatype of the offset value to equal a datatype small enough to reduce the footprint of the hash table, yet large enough to cover the size build key array. For example, either 1-byte, 2-byte, or 4-byte integers may be used as the offset value. In other examples, coprocessor 108p-1 may be configured to use other datatypes for the offset value.

As mentioned before, each hash bucket element corresponds to a hash bucket that contains a chain of build key array elements. The hash bucket element stores an offset value to a member build key array element in the chain and to a link array element. The link array element stores a next offset value that identifies another build key array element that is a member of the chain, and another link array element holding an offset value of another build key array element in the chain or the value 0, to indicate the end of the chain. For example, if a chain of build key array elements for a particular hash bucket includes element X and element Y and the offset value for element Y is stored in hash bucket element H1, then link array element L1, in the link array, may store the offset value for the other build key array element that is a member of the chain, element X. The index value used to locate link array element L1 equals the index value for the build key array element for element Y, which is derived from the offset value stored in hash bucket element H1.

In an embodiment, the link array is made up of link array elements that are index aligned to the build key array. For example, if the build key array contains 8 elements, then the link array would be configured to contain 8 link array elements. The purpose of implementing a link array that is index aligned to the build key array is that for any particular build key array element, the corresponding link array element at the same index can include an offset to another build key array element in the same hash bucket chain of the particular build key array element. The link array contains link array elements that may contain offset values for locations to other chain members.

Figure 4:
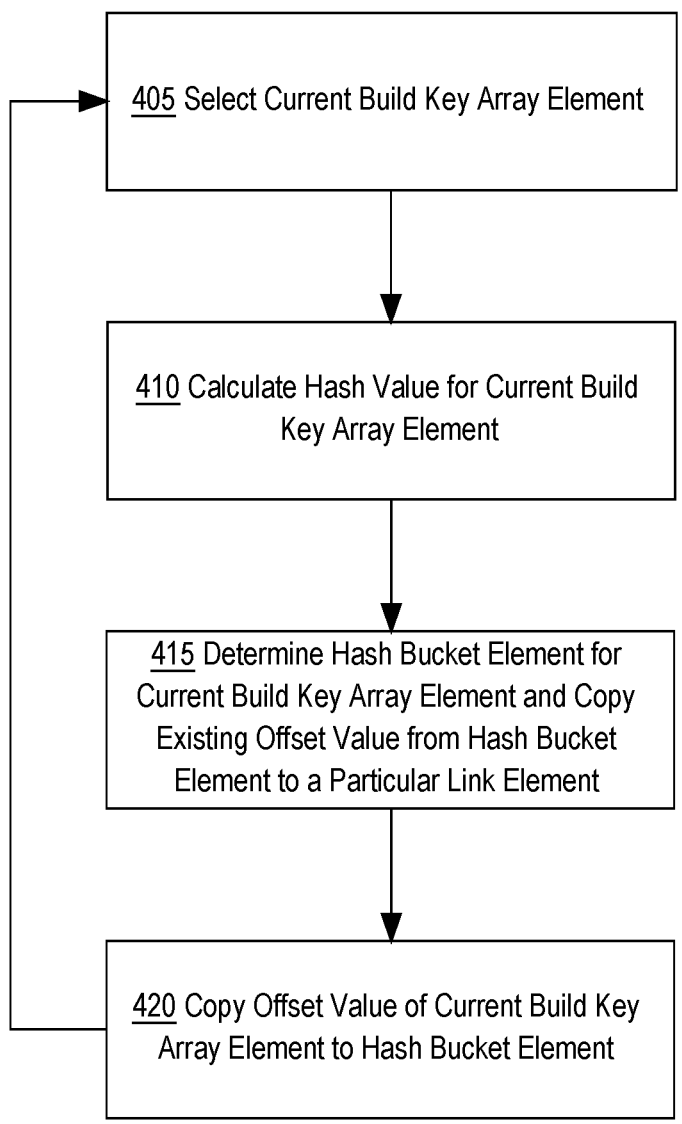
FIG. 4 depicts an example flowchart for calculating hash values for build key array elements and loading build key array elements into a hash bucket array and a link array.
Figure 5A:
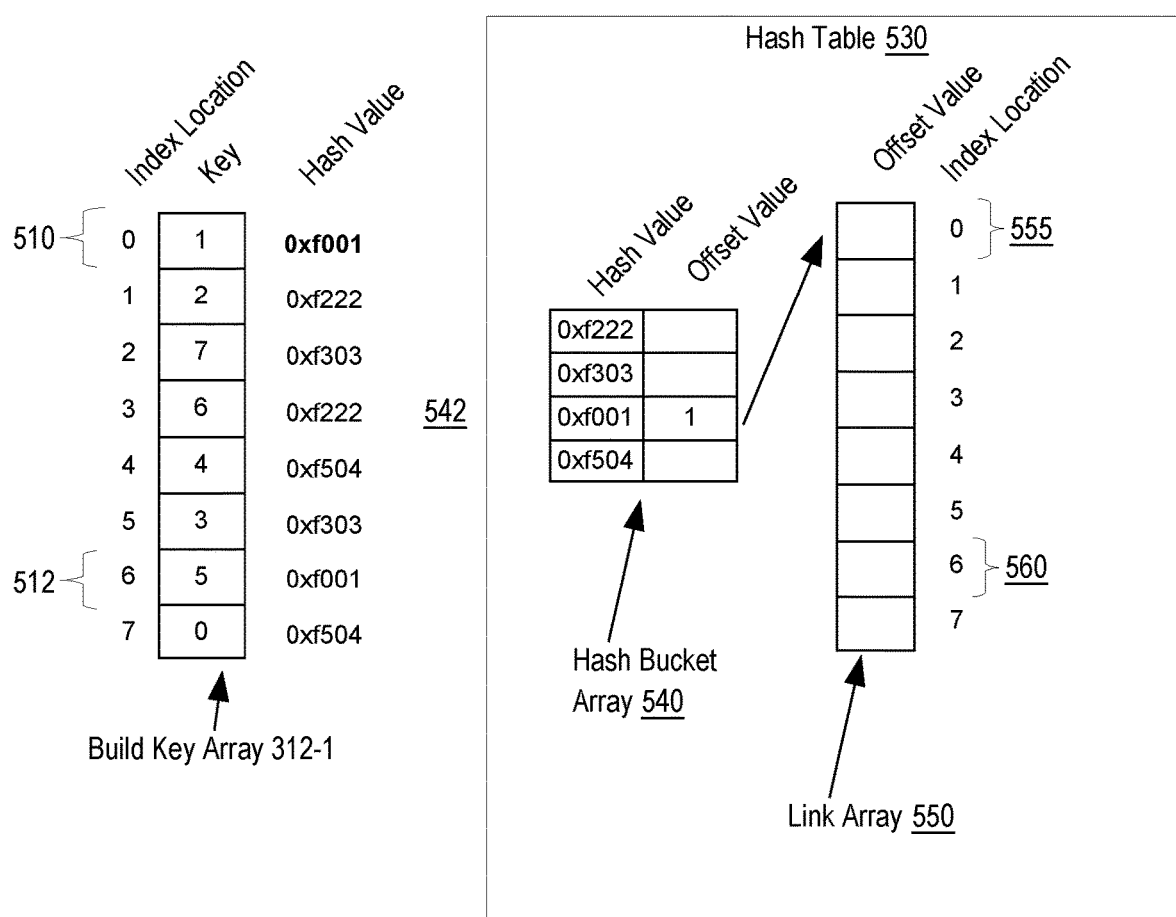
FIGS. 5A, 5B, and 5C each depict graphical representations of different stages of loading offset values for build key array elements into the hash table, including loading offset values into a hash bucket array and a link array.
Figure 5B:
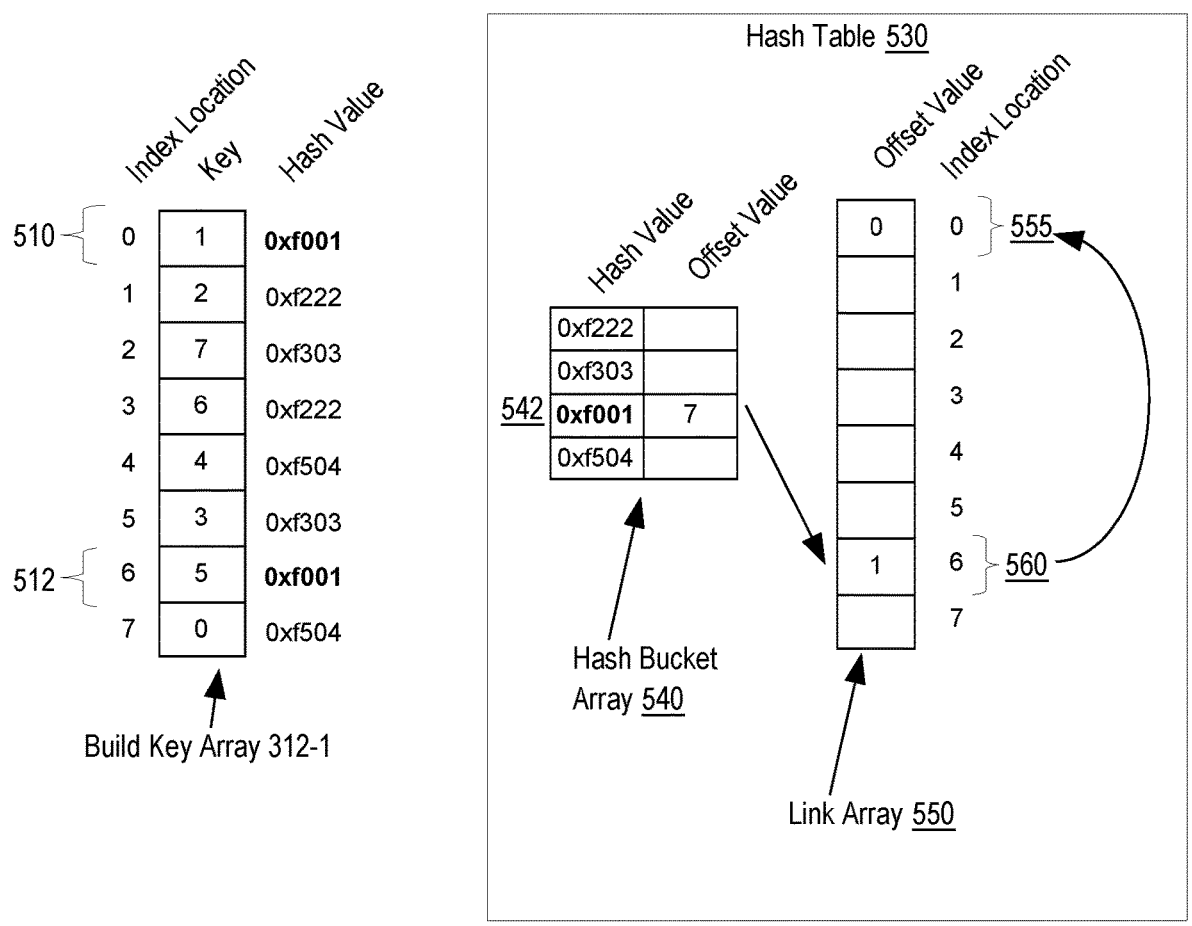
Figure 5C:
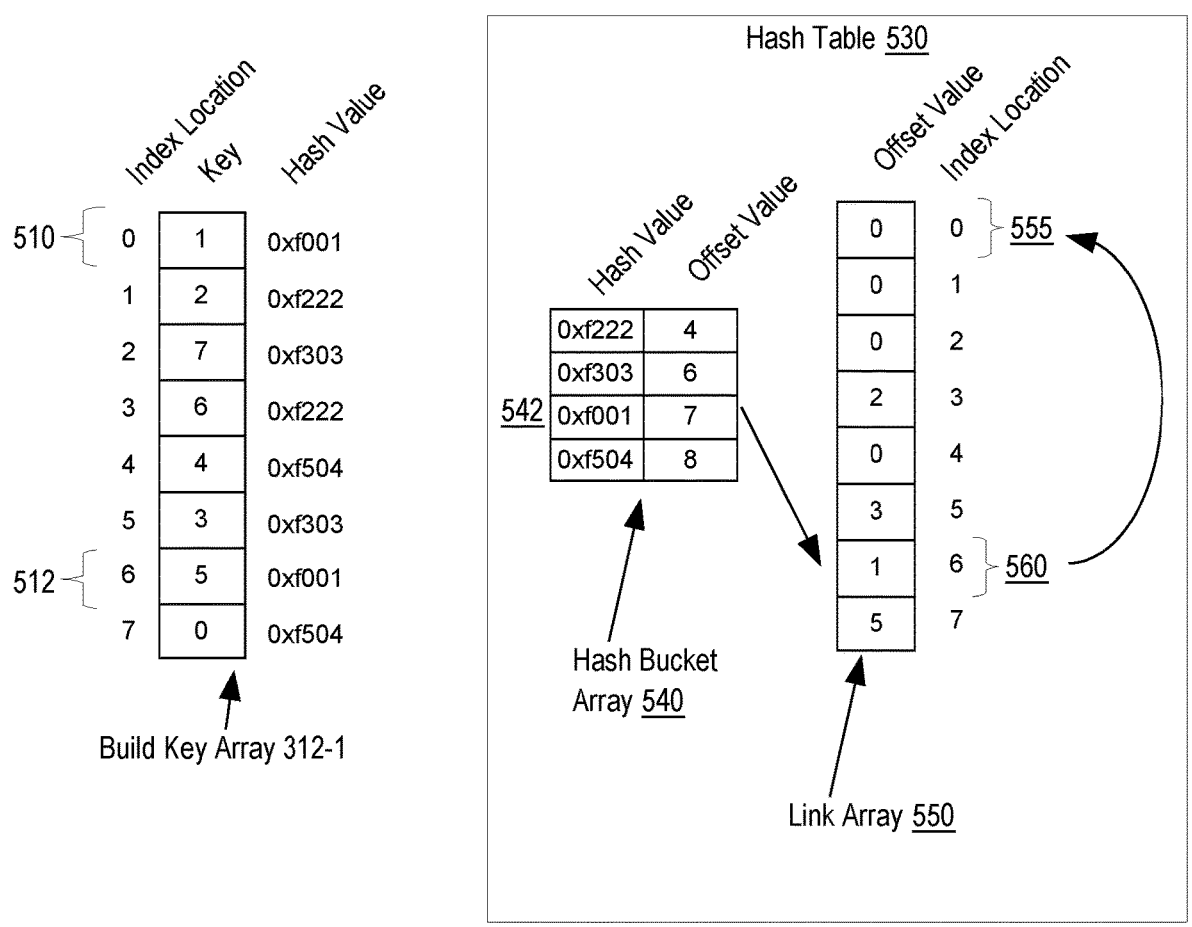

FIG. 4 depicts a flowchart of a procedure for generating a hash table. The procedure involves performing a series steps in multiple iterations of a loop. The procedure is illustrated using hash table structures generated in cache 108c-1 that are illustrated in FIGS. 5A, 5B, and 5C. These figures each represent a different stage of generating and populating the hash table data structure.

At step 405, coprocessor 108p-1 selects a build key array element from the build key array 310-1. In an initial iteration, coprocessor 108p-1 selects the build key array element at index location 0 within the build key array 312-1 (see FIG. 5A), which is build key array element 510.

At step 410, coprocessor 108p-1 calculates a hash value for the selected build key array element. For example, coprocessor 108p-1 calculates the hash value for build key array element 510 to be "0xf001."

At step 415, coprocessor 108p-1 determines the particular hash bucket element that corresponds to the calculated hash value for the selected element, and copies an existing offset value from the particular hash bucket element to the link array. In an embodiment, coprocessor 108p-1 is configured to determine the particular hash bucket element from the hash bucket array by finding the particular hash bucket element that has an assigned hash value that matches the hash value calculated for element 510. Referring to FIG. 5A, hash bucket element 542, of hash bucket array 540, has the assigned hash value of "0xf001." After coprocessor 108p-1 finds the matching hash bucket element 542, coprocessor 108p-1 copies the existing offset value stored in hash bucket element 542 to the link array element, in link array 550, that corresponds to the aligned index position of the selected element 510. Using the existing example, coprocessor 108p-1 would copy the existing offset value, if it exists, from hash bucket element 542 to link array element 555, which has an index position, 0, which matches the selected build key array element 510.

In an embodiment, if hash bucket element 542 does not have an existing offset value, or, for example, the existing offset value is set to zero, then coprocessor 108p-1 may omit the step of copying the offset value from the hash bucket element 542 to the link array element 555.

At step 420, coprocessor 108p-1 inserts an offset value calculated for the selected element into the particular hash bucket element that is assigned the matching hash value. In an embodiment, the offset value is based on the index position of the currently selected build key array element, which in this illustration is build key array element 510. The offset value may be a value that is calculated as the index position of the element 510 plus 1, which in this example is (0+1=1). In an embodiment, coprocessor 108p-1 then inserts the offset value for element 510 into hash bucket element 542.

After completing step 420, coprocessor 108p-1 returns to step 405, iterating through the entire set of elements within the build key array 312-1. FIG. 5B depicts an example of loading build key array element 512 into hash bucket array 540 where the hash bucket element 542 already contains the loaded offset value from build key array element 510.

At step 405, coprocessor 108p-1 selects element 512. At step 410, coprocessor 108p-1 calculates the hash value for element 512 as "0xf001." Then at step 415, coprocessor 108p-1 determines that hash bucket element 542 is assigned the hash value "0xf001" and coprocessor 108p-1 then copies the current offset value from hash bucket element 542, which is the offset value associated with element 510, to the link array element 560. Link array element 560 is located at link array index position "6" which is index aligned to the index position for the selected element 512. After coprocessor 108p-1 performs the copy operation, link array element 560 contains the offset value "1" which is associated with the previously loaded element 510 that has the same calculated hash value of "0xf001."

At step 420, coprocessor 108p-1 inserts the calculated offset value for the element 512 into hash bucket element 542. Referring back to FIG. 5B, the generated offset value for element 512 is "7," which is calculated at the index position of build key array element 512, (6+1=7). In an embodiment, coprocessor 108p-1 repeats steps 405-420 until hash table 530 reflects the entire build key array 312-1. FIG. 5C represents an example embodiment of a fully populated hash table 530 containing offset values.

The steps of populating the hash table using the partition 310 has been described in the context of iterating through each element one-by-one and performing operations to insert offset values corresponding to each build key array element into the hash table. In an embodiment, sets of build key array elements may be inserted in batches into the hash table using a series of vectorized operations. Details describing a vectorized approach for building the hash table are described in the VECTORIZED OPERATIONS section herein.

In an embodiment, a hash bucket chain build key array elements have the same calculated hash value. During the probe phase, members of the chain build key array elements are identified using a chain of offset values that links the member build key array elements together. Members of the set of build key array elements are identified by the index positions calculated from the offset values stored in the hash bucket array and the link array.

Probe Phase

Figure 6:
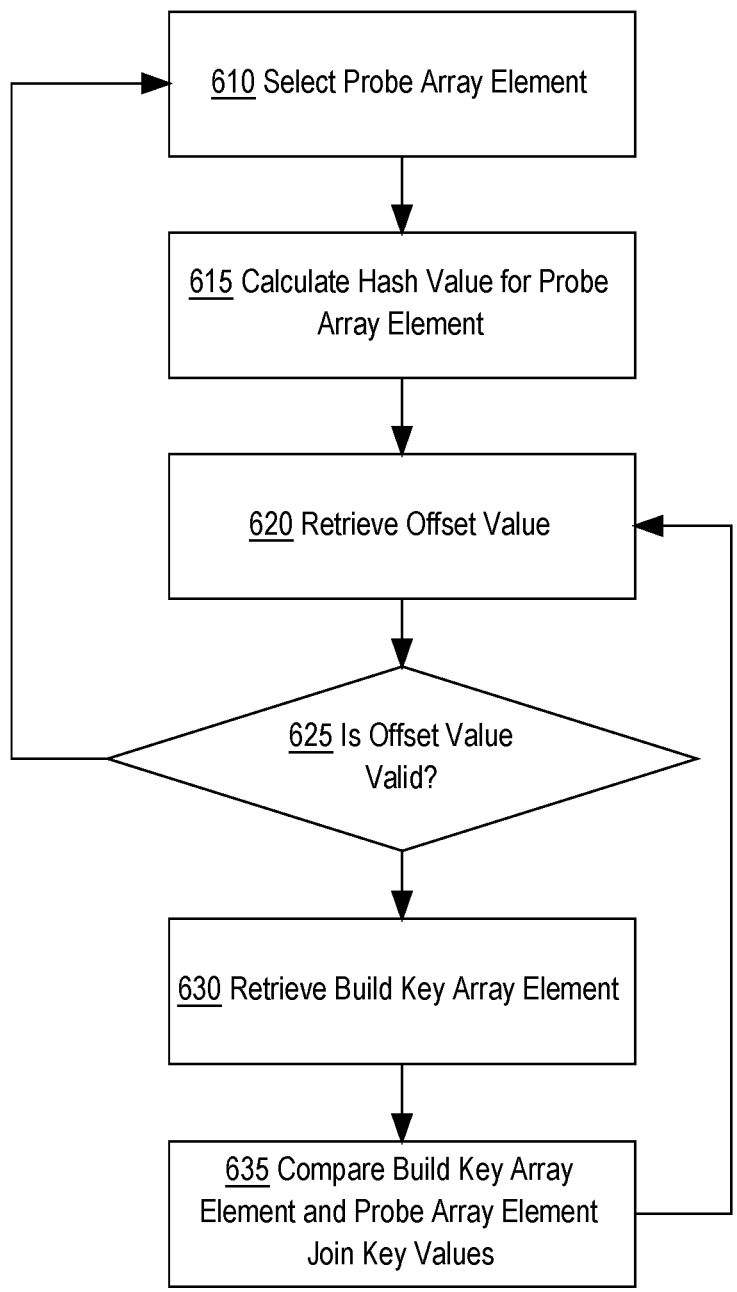
FIG. 6 depicts an example flowchart for comparing join key values from a probe table to rows in a table loaded into a hash table.

Referring back to FIG. 2, at step 225 coprocessor 108*p*-1 performs the probe phase for a partition. FIG. 6 is a flowchart depicting a procedure for probing hash table 530. The procedure involves performing a series steps in multiple iterations of a loop At step 610, coprocessor 108*p*-1 selects a probe key array element from the probe key array 314-1. In an initial iteration, coprocessor 108*p*-1 starts with the first probe key array element at the first index.

At step 615, coprocessor 108*p*-1 calculates a hash value for the selected probe key array element value. Coprocessor 108*p*-1 calculates the hash value for the selected probe key array element as "0xf001."

At step 620, coprocessor 108*p*-1 retrieves the current offset value from the hash table. In an embodiment, if coprocessor 108*p*-1 is retrieving the current offset value using the calculated hash value from step 615, then coprocessor 108*p*-1 accesses the specific hash bucket element from the hash bucket array based on the calculated hash value. Referring to FIG. 5C, as an example, coprocessor 108*p*-1 uses the calculated hash value "0xf001" to access hash bucket element 542. Hash bucket element 542 contains offset value "7", which coprocessor 108*p*-1 retrieves as the current offset value.

In an embodiment, if coprocessor 108*p*-1 is retrieving an offset value using a previously received offset value, then coprocessor 108*p*-1 accesses the link array and identifies the specific link array element by deriving the location of the specific link array element from the previously received offset value. For instance, if the previously received offset value is "7", then coprocessor 108*p*-1 derives the location of the specific link array element as offset value−1 (7−1=6), where "6" is the index location value for the specific link array element.

At step 625, coprocessor 108*p*-1 determines whether the current offset value is valid by determining whether the current offset value refers to a specific build key array element in the build key array. In an embodiment, coprocessor 108*p*-1 determines whether the current offset value refers to a specific element by deriving an index value from the current offset value. As described in the build phase, an embodiment of the current offset value includes calculating the offset value as index value+1. Therefore, the index value may be derived as the current offset value −1. For example, if the current offset value retrieved at step 620 is "0", then coprocessor 108*p*-1 would derive the index value as (0-1), which equals "−1." Since "−1" does not represent a location of a valid build key array element in the build key array, the current offset value would not be valid. In an embodiment, if coprocessor 108*p*-1 determines that the current index value is not valid, then coprocessor 108*p*-1 proceeds to step 610 to select a new probe key array element from the probe key array 314-1.

In an embodiment, if at step 625 coprocessor 108*p*-1 determines that the current offset value is valid, then coprocessor 108*p*-1 retrieves a specific build key array element. Referring to FIG. 5C as an example, if the current offset value retrieved from hash bucket element 542 (step 620) is "7", then coprocessor 108*p*-1 would derive the index value as (7−1), which equals "6." Since index value 6 is a valid index value that refers to a valid location of a specific build key array element, coprocessor 108*p*-1 proceeds to step 630.

At step 630, coprocessor 108*p*-1 retrieves the specific build key array element from index value of the build key array. Referring to the FIG. 5C example, coprocessor 108*p*-1 would locate element 512, which is located at build key array index value 6.

At step 635, coprocessor 108*p*-1 compares values of the join condition of the specific build key array element and the probe key array element to determine whether the values satisfy the join condition. If the values of the elements satisfy the join condition, then the elements are added to the result set of the join condition.

In an embodiment, the link array 550 is made up of link array elements that contain offset values to one or more additional member build key array elements that may belong to the chain of build key array elements associated with a particular hash value. Link array elements are linked together by containing an offset value that may be used to locate a particular member build key array element and to locate the next link array element that may contain the next member build key array element for the set of build key array elements. After comparing the specific build key array element to the probe key array element at step 625, coprocessor 108*p*-1 proceeds to step 620 to determine whether there are additional build key array elements to be compared to the probe key array element.

At step 620, coprocessor 108*p*-1 retrieves a new offset value from the link array 550 using the current offset value. Using the FIG. 5C example, offset value "7" was previously used in steps 630 and 635 to compare element 512 to the probe key array element. Coprocessor 108*p*-1 retrieves a new offset value from the link array 550 by deriving the index value for the link array 550 by subtracting 1 from the current offset value (7−1), which equals 6. Coprocessor 108*p*-1 then accesses link array element 560, which is at index value position 6, to retrieve new offset value "1."

At step 625, coprocessor 108*p*-1 determines whether new offset value "1" is valid by determining whether the current offset value refers to a specific element in the build key array 312-1. As discussed, coprocessor 108*p*-1 determines the validity of the new offset value by deriving the index value as (1-1), which equals 0. Since 0 points to existing element 510, the offset value is valid and coprocessor 108*p*-1 proceeds to step 630. If however, the new offset value was 0 or any other invalid offset value, coprocessor 108*p*-1 would return to step 610 to evaluate another probe key array element. This occurs when coprocessor 108*p*-1 determines that there are no other member build key array elements in the set of build key array elements that match the hash value associated with the current build key array element.

As discussed previously, at steps 630 and 635, coprocessor 108*p*-1 retrieves the build key array element and compares it and the probe key array element to determine whether the values satisfy the join condition. Using the FIG. 5C example, at step 630 coprocessor 108*p*-1 retrieves element 510 from the build key array 312-1 using the build key array index value of 0. At step 635, coprocessor 108*p*-1 compares the values in element 505 to the values within the probe key array element, and if they satisfy the join condition the element 512 and the selected probe key array element are added to a result set.

After completing step 635 for the current offset value of 1, coprocessor 108p-1 returns to step 620 to retrieve the next offset value. In FIG. 5C, coprocessor 108p-1 retrieves the next offset value from link array 550 at index value position 0, where index value position is calculated from the current offset value (1-1). The next offset value is retrieved from link array element 555 is 0. At step 625, coprocessor 108p-1 determines whether offset value 0 is valid by deriving the index value (offset value -1). In this case, the index value is calculated as (0-1) "-1." Since "-1" is not a valid index value, there are no more build key array elements matching the current hash value and then coprocessor 108p-1 proceeds to step 610 to select a new probe key array element from the probe key array 314-1.

In an embodiment, the steps of 610-635 are repeated for each probe key array element in the probe key array 314-1 in order to compile a result set of values from the partition.

Steps for probing the hash table using the probe key array 314-1 has been described in the context of iterating through each probe key array element one-by-one and performing operations to compare the probe key array element to matching build key array elements from the hash table. In an embodiment, sets of probe key array elements may be compared to build key array elements in batches using a series of vectorized operations. Details describing a vectorized approach for probing the hash table are described in the VECTORIZED OPERATIONS section herein.

Vectorized Operations

Hash join processing described involves a number of operations that are performed on each of the build key array elements and the probe key array elements during the build phase and the probe phase respectively. For example, the hash join operations during the build phase include selecting a specific build key array element and performing a series of operations to determine which hash bucket the build key array element belongs. In an embodiment, operations performed in the build phase and the probe phase may be implemented as groups of vectorized operations. Vectorized operations represent the technique of performing a set of operations on a set of elements, as a batch, before proceeding to the next set of operations. For instance, instead of performing the series of steps of: selecting a build key array element, calculating the hash value for the build key array element, determining the hash bucket element for the build key array element, copying existing values from the hash bucket element to a specific link array element, and then inserting the offset value for the build key array element into the hash bucket element, operations may be configured to perform each step of the build phase on a set of elements instead of performing the step on each element one by one. In an embodiment, vectorized operations of the build phase may be configured to perform each step of the build phase on a set of build key array elements, where the result of each step is stored within a temporary array of intermediate values, which are then used as input for the next step of the build phase.

Referring to FIG. 4, each of the steps of the build phase may be implemented as vectorized operations using a set of build key array elements. In an embodiment, at step 405 coprocessor 108p-1 selects a set of build key array elements from the build key array. The set of build key array elements may include any number of build key array elements from two build key array elements to the entire build key array. At step 410, coprocessor 108p-1 calculates hash values for the selected set of build key array elements and stores the hash values in a temporary array, which may be accessed in the subsequent steps. At step 415, coprocessor 108p-1 determines the particular hash bucket elements that correspond to each of the build key array elements in the set of build key array elements. In an embodiment, coprocessor 108p-1 may store each of the corresponding hash bucket elements within the existing temporary array or may generate a new temporary array to store references to the corresponding hash bucket elements. In an embodiment, the temporary array may be structured to contain mapping that maps each build key array element of the set of build key array elements to hash bucket elements of the hash bucket array based on the calculated hash values for the build key array elements. Additionally, at step 415, coprocessor 108p-1 copies the existing offset values from the corresponding hash bucket elements to a set of link array elements in the link array. For example, coprocessor 108p-1 may iterate through the set of build key array elements and the temporary array of corresponding hash bucket elements and copy each existing offset value into the link array element, in link array 550 that corresponds to the aligned index position for the build key array element in the set of build key array elements. At step 420, coprocessor 108p-1 may then iterate through the set of build key array elements and insert the offset values into the corresponding hash bucket elements. In an embodiment, if the set of build key array elements is a subset of the build key array, then coprocessor 108p-1 may repeat steps 405-420 by selecting a new set of build key array elements. In an embodiment, each of the steps of the probe phase may be configured to use a set of probe key array elements from the probe key array 360 for compiling a result set.

The build and probe phases may rely on code branching when evaluating whether offset values within hash bucket elements and link array elements match particular build and probe key array elements. Branching may be defined as instructions that are dependent of data values in order to determine which subsequent instructions to perform. One example of code branching is if/else statements where depending on data values the CPU may execute one block of code instead of another. Branch mispredictions may occur when coprocessor 108p-1 predicts data values based upon speculated values, and the prediction of data values is incorrect. In an embodiment, eliminating branch mispredictions may be accomplished by implementing a series of primitive operations to replace if/else operations. Below an example of pseudo code containing a set of primitive operations implemented to determine matching hash bucket elements for probe key array elements.

```
unsigned int matchidx = 0;
unsigned int rowidx;
for ( rowidx = 0; rowidx < nrows; rowidx++ )
{
    hidx = (hashedkeysprobe[rowidx] & MASK) >> SHIFT;
    hashbucket_positions[rowidx] = hashbucket_array[hidx];
    matches_array[matchidx] = rowidx;
    matchidx += (hashbucket_positions[rowidx] > 0 );
}
nummatches = matchidx;
```
where:
matchidx = the match index value,
rowidx = the row index value,
nrows = the total number of rows in the set of probe key array elements,
hidx = the hash value for the particular row index value,
hashbucket_positions = an array of offset values from the hash bucket elements in the hash bucket array, represented by hashbucket_array,
hatches_array = an array of row index values that match the particular probe key array element,
matchidx = a matching offset value, and
nummatches = the total number of matches contained in the matches array.

Referring to the above pseudo code, the branchless operations include building the matches_array. By only incrementing the matchidx when the hashbucket_positions[rowidx] represents an offset value that is greater than zero, where the hashbucket_positions[rowidx] is assigned the value of a hash bucket element from the hashbucket_array, the matches_array will only contain valid matches and invalid matches will be overwritten by subsequent valid matches. Therefore the above pseudo code removes the need for an if/else condition, thereby eliminating branch misprediction scenarios.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
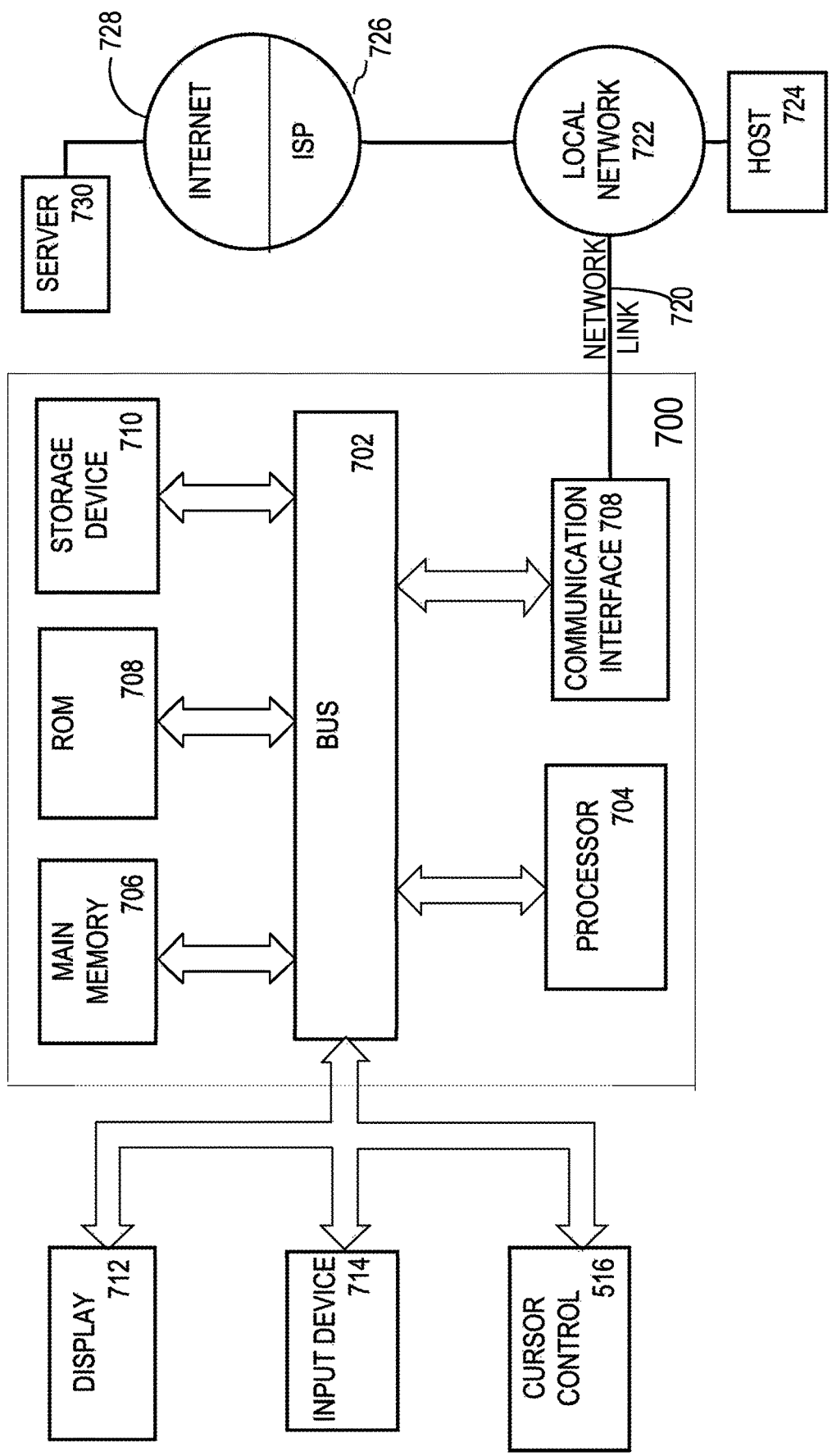
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 8:
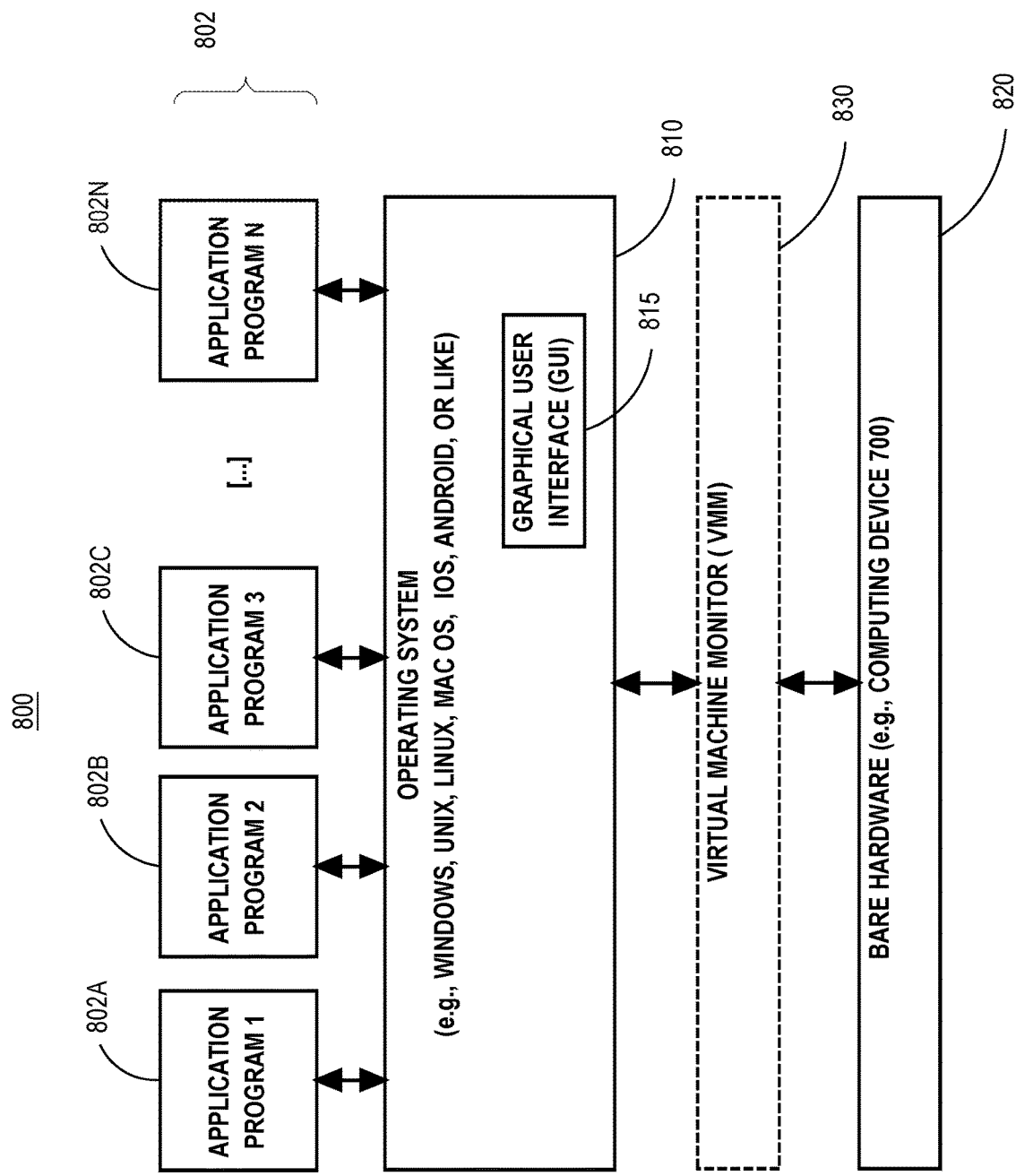
FIG. 8 is a block diagram illustrating a computer software system that may be used to implement the techniques described herein.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method, comprising:
    storing a partition comprising build key array elements of a build key array;
    generating a hash table comprising:
        a hash bucket array comprising hash bucket elements, each hash bucket element of the hash bucket elements corresponding to a hash bucket of the hash table;
        a link array comprising link array elements, wherein the link array is index aligned with the build key array;
        wherein each hash bucket element of said hash bucket elements includes an offset value that identifies a respective link array element of the link array elements, wherein the respective link array element:
            identifies an offset value of the link array that corresponds to a member build key array element of the build key array elements that is a member of said each hash bucket element; or
            specifies that there is no other member build key array elements of the build key array elements for the hash bucket corresponding to the hash bucket element;
    for a particular build key array element of the build key array, determining a particular hash bucket element that corresponds to the particular build key array element based upon a calculated hash value for the particular build key array element;
    if the particular hash bucket element contains an existing offset value that identifies an existing link array element, then copying the existing offset value from the particular hash bucket element to a particular link array element identified by a particular offset value that also identifies the particular build key array element; and
    inserting the particular offset value that also identifies the particular build key array element into the particular hash bucket element of the hash bucket array.

2. The method of claim 1, wherein offset values stored in the hash bucket elements of the hash bucket array and the link array elements of the link array are integer values; and
    wherein a byte size of the integer values is based on a size of the build key array so that each build key array element in the build key array may be associated with a unique integer value.

3. The method of claim 1, wherein the hash bucket array is sized to contain a number of hash bucket elements based on a size of the partition.

4. The method of claim 3, wherein a number of hash bucket elements in the hash bucket array is a power of two.

5. The method of claim 1, further comprising:
    prior to storing the partition, receiving the partition from a computer server; and
    wherein the partition comprises a plurality of rows that make up a partition of a table, wherein the partition represents a unique subset of rows from the table.

6. The method of claim 5, wherein a size of the partition received is based upon a configured cache size that represents storage space where the partition is stored.

7. The method of claim 1, further comprising:
    receiving a probe key array of probe key elements;
    for a particular probe key array element of the probe key array, determining a hash bucket element that corresponds to the particular probe key array element based upon a calculated hash value for the particular probe key array element;
    determining that the particular hash bucket element contains a valid offset value that identifies a first build key array element;
    determining that the particular probe key array element and a first join key value in the first build key array element satisfy a join condition; and
    inserting the first build key array element and the particular probe key array element into a result set.

8. The method of claim 7, further comprising:
    determining a particular link array element identified by the valid offset value that identifies the first build key array element contains a second offset value that identifies a second build key array element;
    determining that the particular probe key array element and a second join key value in the second build key array element satisfy the join condition; and
    inserting the second build key array element and the particular probe key array element into a result set.

9. A computer implemented method, comprising:
    storing a build key array comprising build key array elements;

generating hash table comprising:
  a hash bucket array comprising hash bucket elements, each hash bucket element of the hash bucket elements corresponding to a hash bucket of the hash table;
  a link array comprising link array elements, wherein the link array is index aligned with the build key array elements;
  wherein each hash bucket element includes an offset value that identifies a respective link array element of the link array elements, wherein the respective link array element:
    identifies an offset value of the link array that corresponds to a member build key array element of the build key array elements that is a member of said each hash bucket element; or
    specifies that there is no other member build key array elements of the build key array elements for the hash bucket corresponding to the hash bucket element;
selecting at least a subset of build key array elements of the build key array elements and calculating hash values for each build key array element in the subset of build key array elements;
generating a temporary array that maps each build key array element of the subset of build key array elements to hash bucket elements of the hash bucket array based on the calculated hash values for the subset of build key array elements;
for each of the hash bucket elements mapped in the temporary array, copying existing offset values from the hash bucket elements to corresponding link array elements that have an offset values equal to the offset values of the subset of build key array elements in the temporary array; and
for each build key array element of the subset of build key array elements mapped in the temporary array, inserting the offset value from the each build key array element into the corresponding hash bucket element of the hash bucket elements that is mapped to the build key array element in the temporary array.

10. The method of claim 9, further comprising:
receiving a probe key array of probe key array elements and a join operation, wherein the join operation specifies a join condition between one or more join key values from the build key array and one or more join key values from the probe key array;
selecting at least a subset of probe key array elements of the probe key array and calculating hash values for each probe key array element in the subset of probe key array elements;
generating a probe map array that maps each probe key array element of the subset of probe key array elements to hash bucket elements of the hash bucket array based on the calculated hash values for the subset of probe key array elements;
for each of the hash bucket elements mapped in the probe map array, retrieving a corresponding build key array element from the build key array based upon the offset value associated with hash bucket element;
determining that the one or more join key values from the corresponding build key array element, for each of the hash bucket elements mapped in the probe map array, and the probe key array element satisfy the join condition specified in the join operation by comparing the one or more join key values of the corresponding build key array element to the one or more join key values of the probe key array element; and
inserting the corresponding build key array element and the probe key array element into a result set.

11. The method of claim 10, wherein retrieving the corresponding build key array element from the build key array based upon the offset value associated with the hash bucket element comprises:
generating a matches array that contains valid offset values from the hash bucket elements; and
inserting the valid offset values from the hash bucket elements that contain a offset value that refers to a valid build key array element from the build key array.

12. One or more non-transitory computer-readable media storing sequences of instructions, wherein said sequences of instructions which, when executed by one or more hardware processors, cause:
storing a partition comprising build key array elements of a build key array;
generating a hash table comprising:
  a hash bucket array comprising hash bucket elements, each hash bucket element of the hash bucket elements corresponding to a hash bucket of the hash table;
  a link array comprising link array elements, wherein the link array is index aligned with the build key array;
  wherein each hash bucket element of said has bucket elements includes an offset value that identifies a respective link array element of the link array elements, wherein the respective link array element:
    identifies an offset value of the link array that corresponds to a member build key array element of the build key array elements that is a member of said each hash bucket element; or
    specifies that there is no other member build key array elements of the build key array elements for the hash bucket corresponding to the hash bucket element;
for a particular build key array element of the build key array, determining a particular hash bucket element that corresponds to the particular build key array element based upon a calculated hash value for the particular build key array element;
if the particular hash bucket element contains an existing offset value that identifies an existing link array element, then copying the existing offset value from the particular hash bucket element to a particular link array element identified by a particular offset value that also identifies the particular build key array element; and
inserting the particular offset value that also identifies the particular build key array element into the particular hash bucket element of the hash bucket array.

13. The one or more non-transitory computer-readable media of claim 12, wherein offset values stored in the hash bucket elements of the hash bucket array and the link array elements of the link array are integer values; and
wherein a byte size of the integer values is based on a size of the build key array so that each build key array element in the build key array may be associated with a unique integer value.

14. The one or more non-transitory computer-readable media of claim 12, wherein the hash bucket array is sized to contain a number of hash bucket elements based on a size of the partition.

15. The one or more non-transitory computer-readable media of claim 14, wherein a number of hash bucket elements in the hash bucket array is a power of two.

16. The one or more non-transitory computer-readable media of claim 12, the sequences of instructions including instructions that, when executed by said one or more hardware processors, cause:
prior to storing the partition, receiving the partition from a computer server; and
wherein the partition comprises a plurality of rows that make up a partition of a table, wherein the partition represents a unique subset of rows from the table.

17. The one or more non-transitory computer-readable media of claim 16, wherein a size of the partition received is based upon a configured cache size that represents storage space where the partition is stored.

18. The one or more non-transitory computer-readable media of claim 12, the sequences of instructions including instructions that, when executed by said one or more hardware processors, cause:
receiving a probe key array of probe key elements;
for a particular probe key array element of the probe key array, determining a hash bucket element that corresponds to the particular probe key array element based upon a calculated hash value for the particular probe key array element;
determining that the particular hash bucket element contains a valid offset value that identifies a first build key array element;
determining that the particular probe key array element and a first join key value in the first build key array element satisfy a join condition; and
inserting the first build key array element and the particular probe key array element into a result set.

19. The one or more non-transitory computer-readable media of claim 18, the sequences of instructions including instructions that, when executed by said one or more hardware processors, cause:
determining a particular link array element identified by the valid offset value that identifies the first build key array element contains a second offset value that identifies a second build key array element;
determining that the particular probe key array element and a second join key value in the second build key array element satisfy the join condition; and
inserting the second build key array element and the particular probe key array element into a result set.

20. One or more non-transitory computer-readable media storing sequences of instructions, wherein said sequences of instructions which, when executed by one or more hardware processors, cause:
storing a build key array comprising build key array elements;
generating hash table comprising:
a hash bucket array comprising hash bucket elements, each hash bucket element of the hash bucket elements corresponding to a hash bucket of the hash table;
a link array comprising link array elements, wherein the link array is index aligned with the build key array elements;
wherein each hash bucket element includes an offset value that identifies a respective link array element of the link array elements, wherein the respective link array element:
identifies an offset value of the link array that corresponds to a member build key array element of the build key array elements that is a member of said each hash bucket element; or
specifies that there is no other member build key array elements of the build key array elements for the hash bucket corresponding to the hash bucket element;
selecting at least a subset of build key array elements of the build key array elements and calculating hash values for each build key array element in the subset of build key array elements;
generating a temporary array that maps each build key array element of the subset of build key array elements to hash bucket elements of the hash bucket array based on the calculated hash values for the subset of build key array elements;
for each of the hash bucket elements mapped in the temporary array, copying existing offset values from the hash bucket elements to corresponding link array elements that have an offset values equal to the offset values of the subset of build key array elements in the temporary array; and
for each build key array element of the subset of build key array elements mapped in the temporary array, inserting the offset value from the each build key array element into the corresponding hash bucket element of the hash bucket elements that is mapped to the build key array element in the temporary array.

21. The one or more non-transitory computer-readable media of claim 20, the sequences of instructions including instructions that, when executed by said one or more hardware processors, cause:
receiving a probe key array of probe key array elements and a join operation, wherein the join operation specifies a join condition between one or more join key values from the build key array and one or more join key values from the probe key array;
selecting at least a subset of probe key array elements of the probe key array and calculating hash values for each probe key array element in the subset of probe key array elements;
generating a probe map array that maps each probe key array element of the subset of probe key array elements to hash bucket elements of the hash bucket array based on the calculated hash values for the subset of probe key array elements;
for each of the hash bucket elements mapped in the probe map array, retrieving a corresponding build key array element from the build key array based upon the offset value associated with hash bucket element;
determining that the one or more join key values from the corresponding build key array element, for each of the hash bucket elements mapped in the probe map array, and the probe key array element satisfy the join condition specified in the join operation by comparing the one or more join key values of the corresponding build key array element to the one or more join key values of the probe key array element; and
inserting the corresponding build key array element and the probe key array element into a result set.

22. The one or more non-transitory computer-readable media of claim 21, wherein retrieving the corresponding build key array element from the build key array based upon the offset value associated with the hash bucket element comprises:
generating a matches array that contains valid offset values from the hash bucket elements; and inserting the valid offset values from the hash bucket elements that contain a offset value that refers to a valid build key array element from the build key array.

\* \* \* \* \*